United States Patent [19]
Mihara et al.

[11] Patent Number: 5,615,982
[45] Date of Patent: Apr. 1, 1997

[54] GEAR FINISHING APPARATUS

[75] Inventors: Toshihide Mihara, Amagasaki; Ryoji Yoshida, Suita; Yutaro Kuranaga, Sanda; Tomoyuki Iwata, Asahikawa, all of Japan

[73] Assignee: Kanzaki Kokyukoki MFG. Co., Ltd., Japan

[21] Appl. No.: 392,974

[22] PCT Filed: Jul. 7, 1994

[86] PCT No.: PCT/JP94/01101

§ 371 Date: Apr. 17, 1995

§ 102(e) Date: Apr. 17, 1995

[87] PCT Pub. No.: WO95/01849

PCT Pub. Date: Jan. 19, 1995

[30] Foreign Application Priority Data

Jul. 7, 1993 [JP] Japan .................................. 5-167669

[51] Int. Cl.⁶ .................................................. B23F 19/06
[52] U.S. Cl. .............................................. 409/55; 72/102
[58] Field of Search ............................ 409/37, 40, 49, 409/55; 72/102

[56] References Cited

U.S. PATENT DOCUMENTS

| | | |
|---|---|---|
| 2,228,968 | 1/1941 | Miller . |
| 4,329,096 | 5/1982 | Herscovici . |
| 5,129,185 | 7/1992 | Erhardt et al. . |

FOREIGN PATENT DOCUMENTS

| | | |
|---|---|---|
| 1447855 | 11/1966 | France . |
| 1058336 | 5/1959 | Germany . |
| 2719524 | 12/1977 | Germany . |
| 3930322 | 9/1990 | Germany . |
| 9300936 | 5/1993 | Germany . |
| 1-40097 | 11/1977 | Japan . |
| 259714 | 11/1987 | Japan ........................... 409/49 |
| 4-57319 | 5/1992 | Japan . |
| 2018178 | 10/1979 | United Kingdom . |

*Primary Examiner*—Lowell A. Larson
*Attorney, Agent, or Firm*—Larson and Taylor

[57] ABSTRACT

A gear finishing apparatus having a construction in which a support gear supported by a finishing wheel holding section can support and fix a plurality of finishing wheels in parallel, wherein a finishing wheel holding section makes it possible to move an operating portion for holding and rotating the finishing wheel in a direction parallel to the axis of the finishing wheel and to fix it at predetermined positions within the extent of the movement. If the plurality of finishing wheels are attached to the support gear and the positions thereof are adjusted in advance, a new finishing wheel in an adjusted position can be brought into a processing position by moving and fixing the operating portion of the finishing wheel holding section when one of the attached finishing wheels is worn out, thereby obtaining a rapid and continuous finish processing. Further, if different kinds of finishing wheels are attached in advance, the time required for finishing different kinds of gears to be processed can be reduced.

9 Claims, 9 Drawing Sheets

GEAR FINISHING APPARATUS

FIELD OF INDUSTRIAL APPLICATION

The present invention relates to a gear finishing apparatus in which a finishing wheel having internal teeth is rotated so as to finish a gear piece in mesh with the finishing wheel.

PRIOR ART AND PROBLEMS INVOLVED

When high accuracy in tooth profile is required for a gear, a finish processing to modify the gear deformed by a heat-treatment, i.e., a so-called horning is conducted. The finish processing is performed in such a manner that a finishing wheel meshed with a gear piece (i.e. a gear to be processed) at a predetermined crossed axes angle is rotated so as to modify its tooth profile. The finishing wheel is held in a finishing wheel support gear having a circular form and peripheral external teeth for rotation with the finishing wheel. The support gear is rotated by a driving device in mesh with the peripheral external teeth and is forwarded for cutting into the gear piece. Until the correction of the tooth profile is completed, each tooth of the finishing wheel is repeatedly brought into mesh with a tooth of the gear piece, generally over a number of times, e.g., 20 to 100 times. Thus, the lifetime of a finishing wheel is generally short.

Conventional gear finishing apparatus have only one finishing wheel for each one finishing wheel support gear (Japanese Unexamined Patent Publications Nos. 140097/1977 and 365513/1992). Therefore, every time the finishing wheel has consumed its lifetime, the apparatus must be suspended for replacement with a new finishing wheel. When attaching a finishing wheel, high level accuracy and a careful handling for attachment are required. After the attachment, a dressing treatment is further required for correcting positional errors caused by the gaps necessary for the attachment of the finishing wheel. Therefore, significant time is required for replacing finishing wheels in the processing time for finishing a gear, and therefore there has been a need for time and labor reduction in wheel replacement.

In order to cope with these problems, there has been proposed an apparatus in which an adjustment collar is mounted inside a finishing wheel support gear (Japanese Unexamined Utility Model Publication No. 57319/1992). In this apparatus, a finishing wheel of a diameter is replaced together with a collar having the same diameter so that the replacement of the finishing wheel can be conducted without detaching a gear head. However, this apparatus can not overcome the above problems occurring in the mutual replacement of the finishing wheels having the same diameter. Furthermore, even in replacing a finishing wheel with another wheel of a different diameter, the apparatus can not eliminate the necessity of the careful handling for attachment and the dressing treatment both required for obtaining the above-mentioned high accuracy.

It is an object of the present invention to provide a gear finishing apparatus which can address such demands, perform appropriate replacement of a gear finishing wheel and reduce the time and labor required thereof.

SUMMARY OF THE INVENTION

To fulfill the above object, the present invention provides a gear finishing apparatus in which a finishing wheel with internal teeth is rotated so as to finish a gear piece in mesh with the finishing wheel, the apparatus comprising:

a base portion;

a work holder which is supported by the machine table and holds the gear piece;

a sliding section supported on the base portion to move close to and away from the gear piece on the work holder in a direction substantially perpendicular to the axis of the gear; and a finishing wheel holding section which is supported by the sliding section and holds the finishing wheel, the finishing wheel holding section comprising:

a joint portion for holding the finishing wheel at a predetermined crossed axes angle relative to the gear piece during processing;

an operating portion movable relative to the joint portion in a direction parallel to the axis of the finishing wheel while holding the finishing wheel at the crossed axes angle;

a fixing portion for fixing the operating portion to the joint portion at predetermined position within the extent of the movement;

a circular support ring rotating with the finishing wheel which holds the finishing wheel inside and is supported by the operating portion rotatablly about the central axis of the support ring; and a drive portion which is attached to the operating portion and drives the support ring to rotate, wherein the support ring has a sufficient width and an engaging portion so that the plurality of finishing wheels can be arranged therein adjacent to each other in a direction parallel to the axis of the finishing wheel and fixed.

The gear finishing apparatus of the present invention has a construction in which a support ring held by a finishing wheel holding section can support and fix a plurality of finishing wheels in parallel inside. Further, a finishing wheel holding section makes it possible to move an operating portion for holding and rotating the finishing wheel in parallel to the axis of the finishing wheel and to fix it at predetermined positions within the extent of the movement. Therefore, if the plurality of finishing wheels are attached to the support ring and the positions thereof are adjusted in advance, a new finishing wheel subjected to positional adjustment can be carried to its processing position by moving and fixing the operating portion of the holding section when one of the finishing gears is worn off, thereby obtaining a rapid and continuous finish processing. As set forth, it is possible to beforehand adjust the positions of the plurality of finishing wheels all together, and after starting up processing, it is also possible to rapidly shift the worn finishing wheel by moving the operating portion, thereby making appropriate the attachment of finishing wheels and the finish processing, speeding up the overall operation and simplifying the operational labor.

The present invention will be more clearly understood from the following description of the embodiments with reference to the accompanying drawings.

EMBODIMENTS

Figure 1:
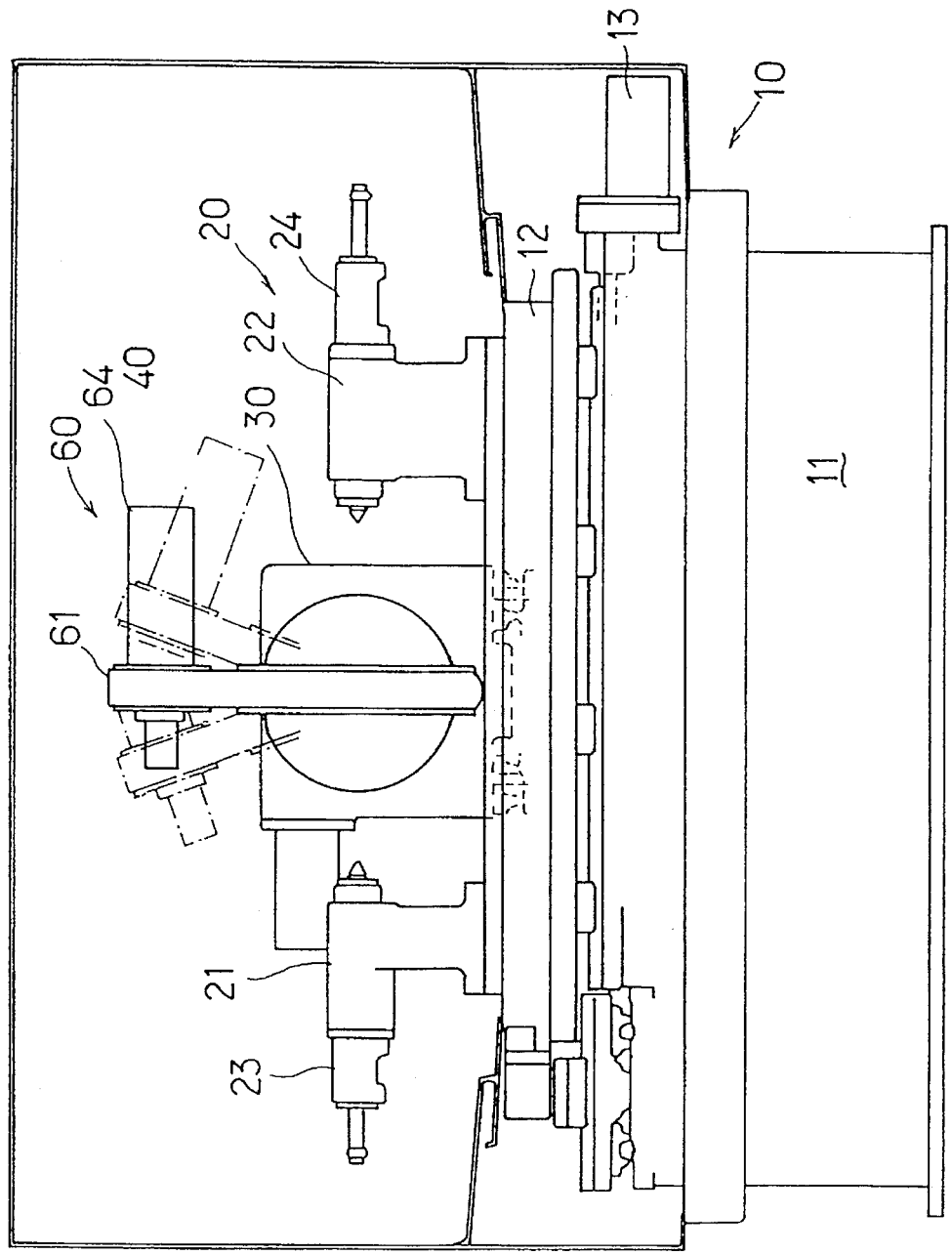
FIG. 1 is a front elevation of an embodiment of a gear finishing apparatus according to the present invention.
Figure 2:
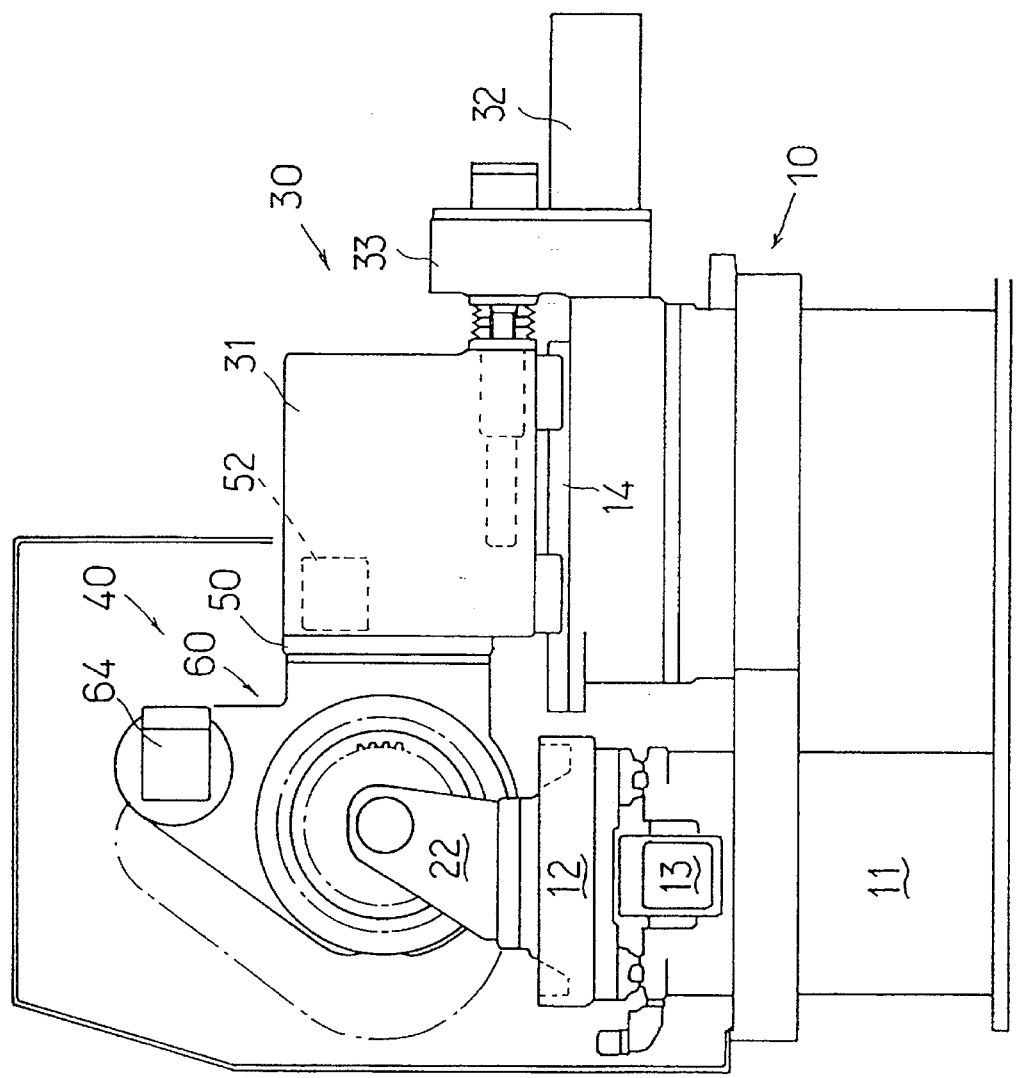
FIG. 2 is a side elevation of the gear finishing apparatus shown in FIG. 1.
Figure 3:
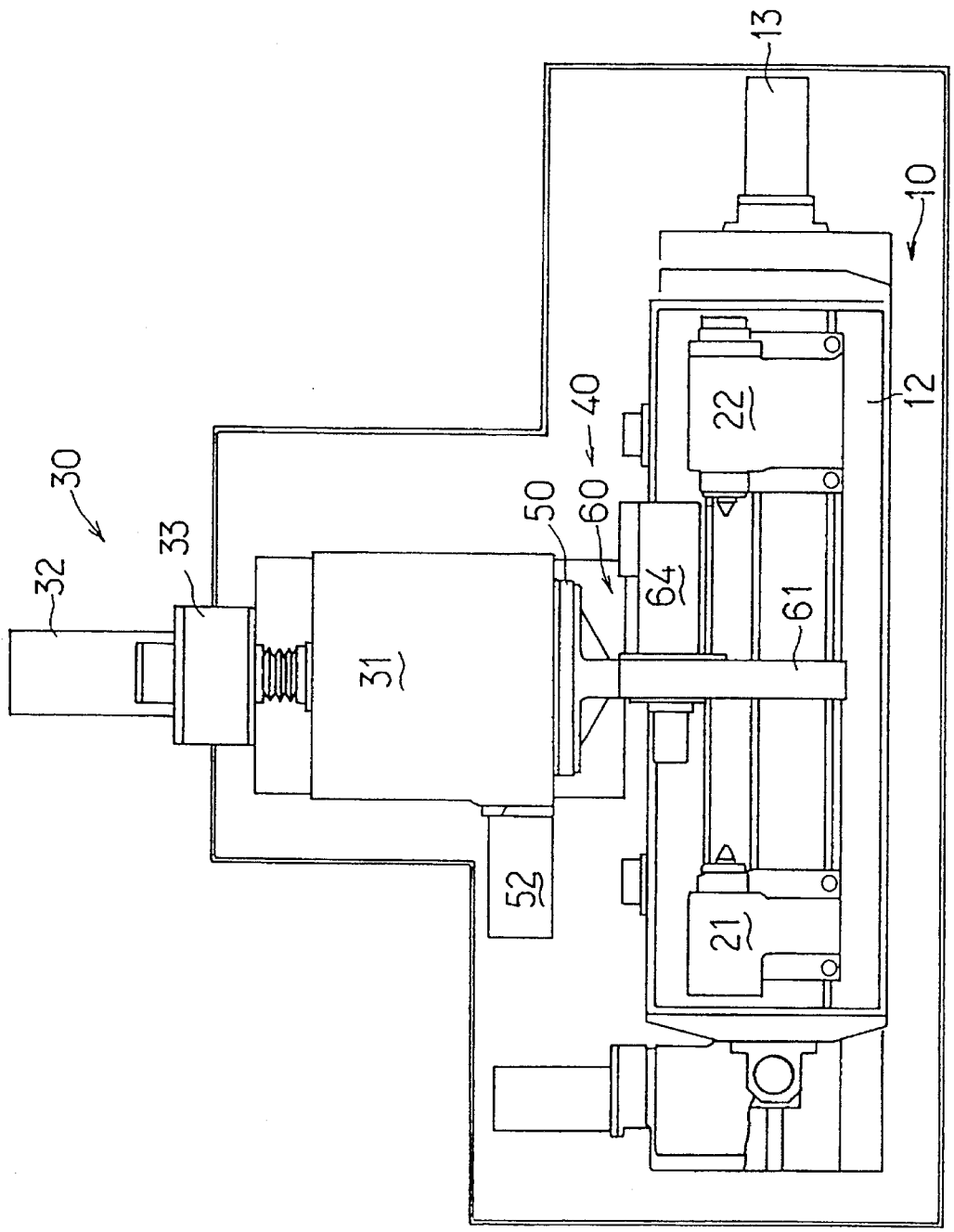
FIG. 3 is a plan view of the gear finishing apparatus shown in FIG. 1.

The gear finishing apparatus shown in FIGS. 1 to 3 comprise a base portion 10 having a table 12 movably provided on a bed 11 and a driving motor 13 for moving the table. A work holder 20 is disposed on the table 12. The work holder 20 comprises two tail stocks 21 and 22 movable in parallel to the movement of the table and driving cylinders 23 and 24 for moving these tail stocks. Behind the table 12 on the bed 11 (right in FIG. 2) is disposed a sliding section 30 supported so as to move back and forth in the direction substantially perpendicular to the axis of the tail stocks. The sliding section 30 comprises a slide body 31 which moves along a guide rail 14 on the bed 11, a driving motor 32 for driving the slide body and a transmission unit 33 for transferring the rotation of the output shaft of the driving motor to the reciprocal motion of the slide body 31. A finishing wheel holder 40 is mounted at the front end of the slide body 31.

Figure 4:
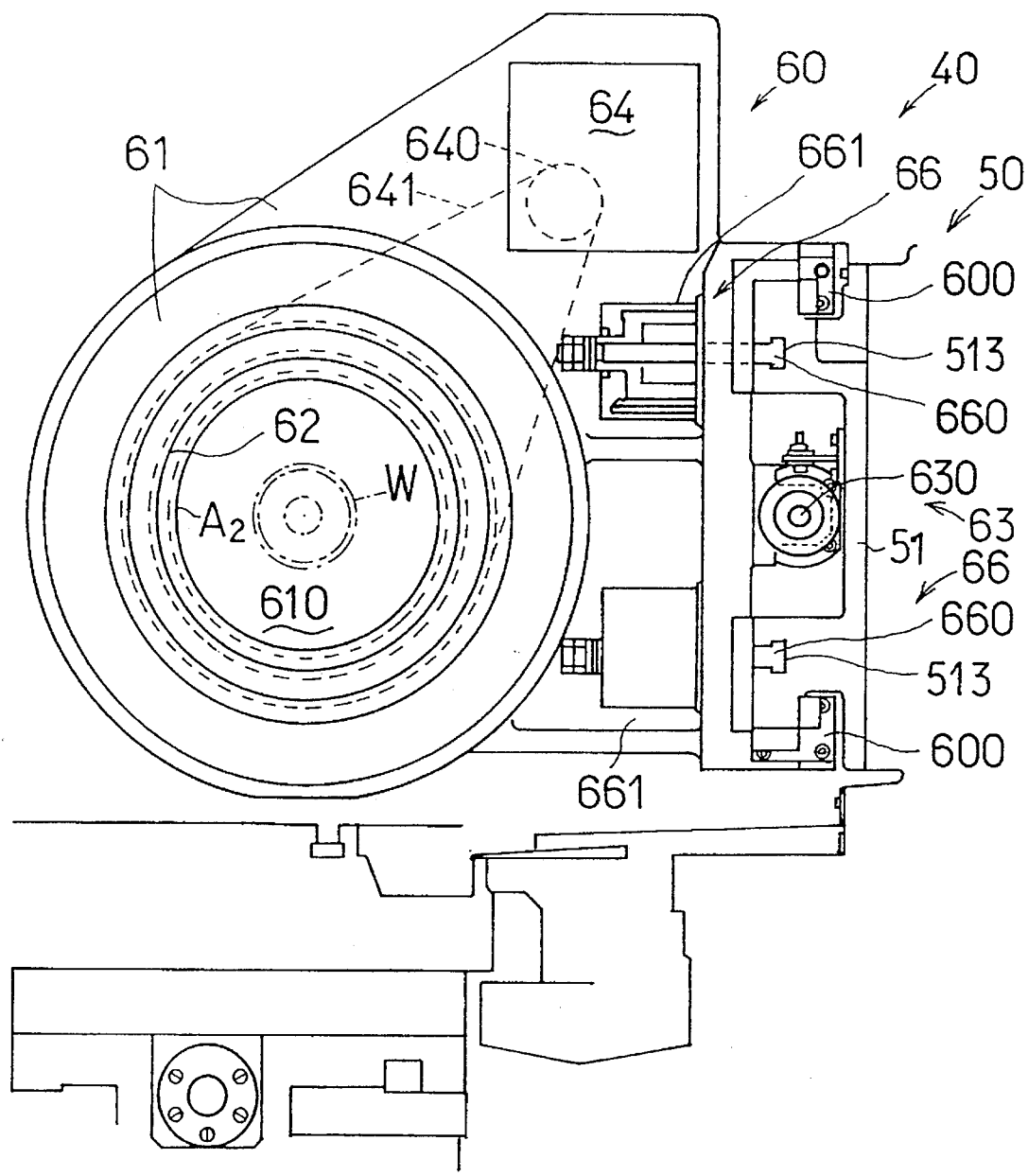
FIG. 4 is a side elevation showing a finishing wheel holding section of the gear finishing apparatus shown in FIG. 1.
Figure 5:
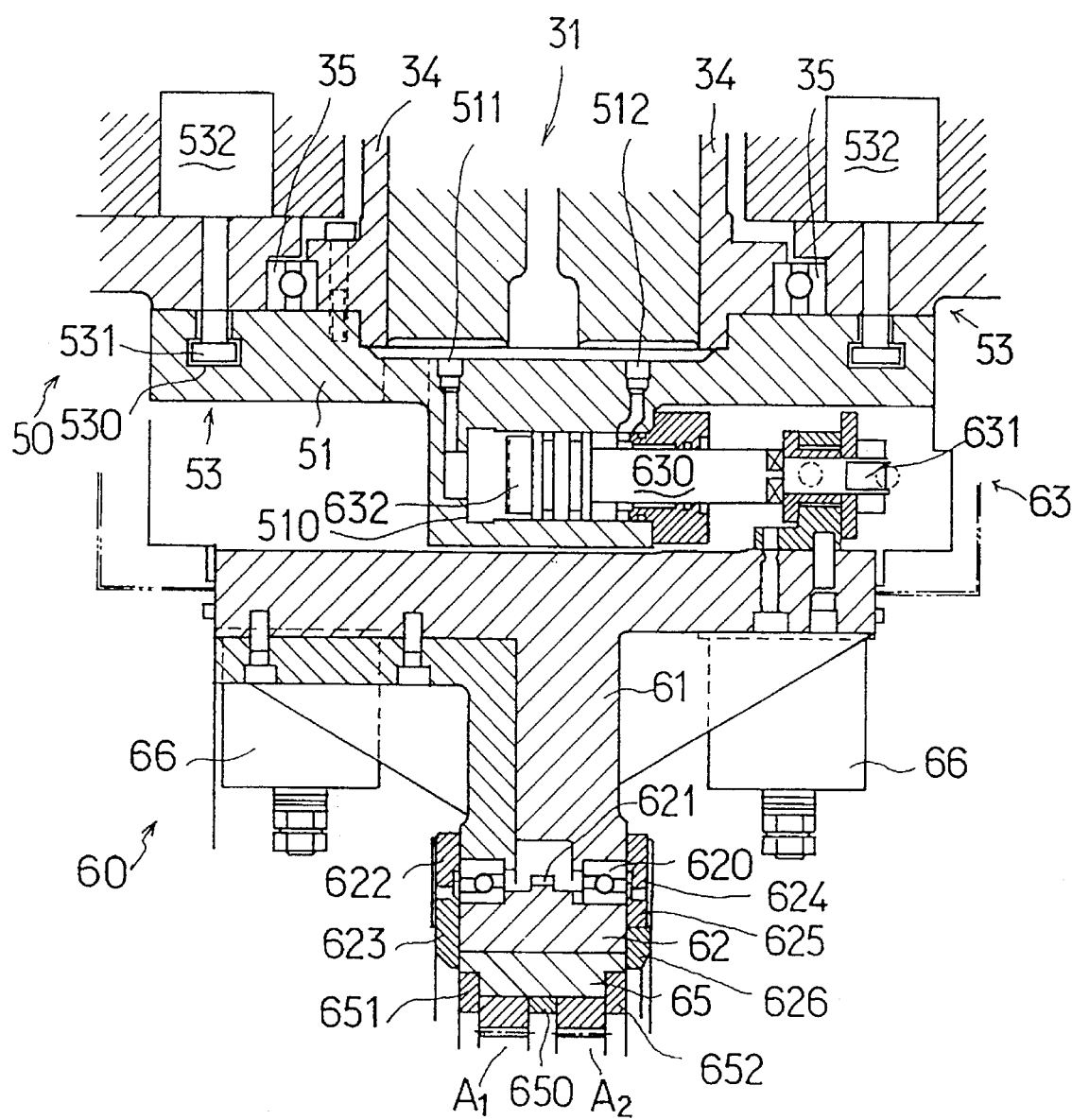
FIG. 5 is a plan view of the finishing wheel holding section shown in FIG. 4.
Figure 6:
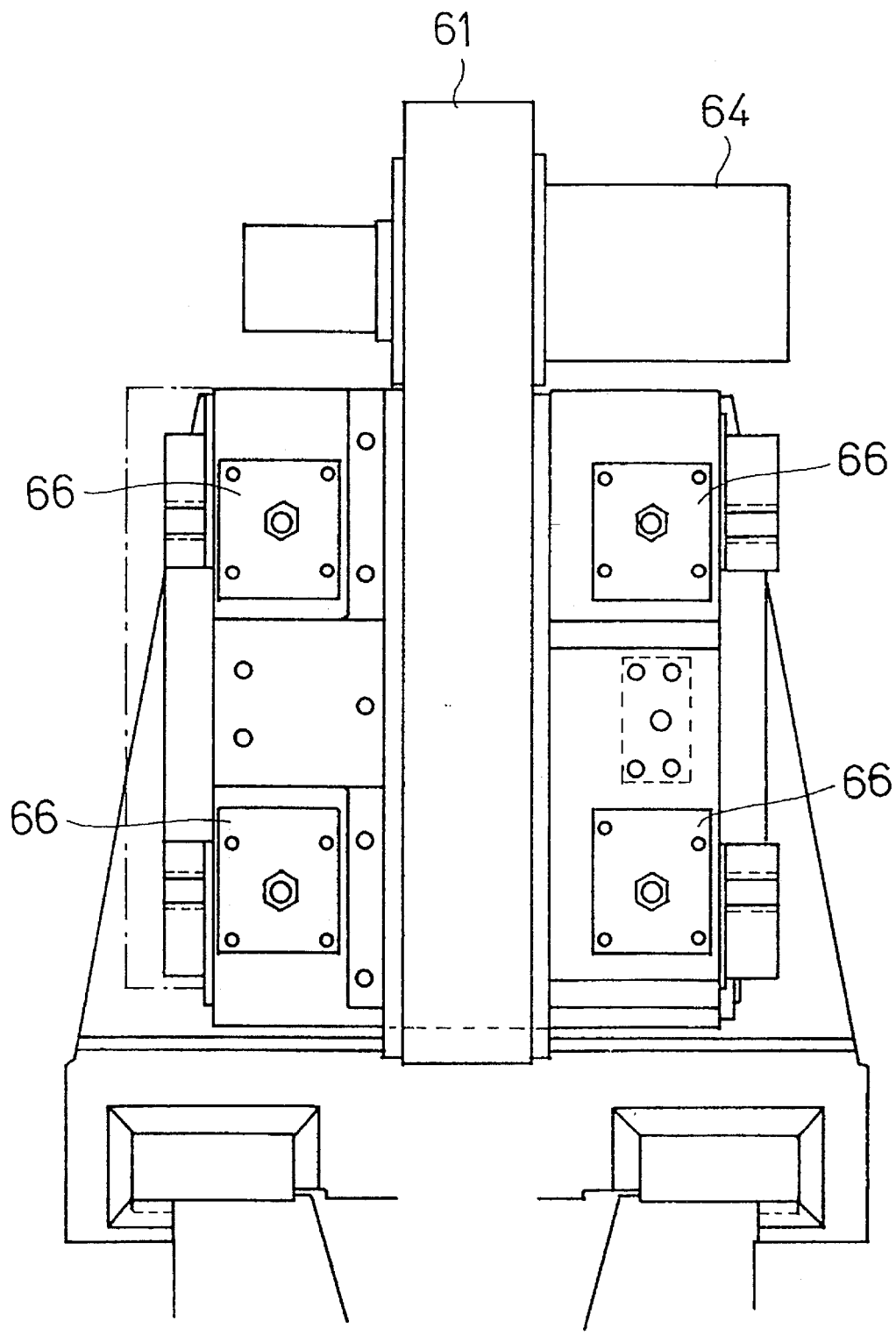
FIG. 6 is a front elevation of the finishing wheel holding section shown in FIG. 4.

The finishing wheel holding section 40 comprises a joint portion 50 connected to the front end of the slide body 31 and an operating portion 60 supported by the joint portion. The details of these elements are shown in FIGS. 4 to 6. The joint portion 50 comprises a supporting body 51 supported via a bearing 35 to rotate about a supporting shaft 34 extending forward from the front end of the slide body 31. At the front of the slide body 31 is provided a driving motor 52 (FIG. 2), and a rack (not shown) attached to the supporting body 51 meshes with a worm gear attached to the output shaft of the driving motor 52 so that the supporting body 51 and the supporting shaft 34 are driven to rotate inside the slide body 31. At the area where the front end of the slide body 31 and the rear end of the supporting body 51 face each other is provided a fixing portion 53 for stopping the rotation of the supporting body. The fixing portion 53 comprises: a groove 530 which narrows outward and circumferentially extends in the supporting body 51 and opens at the rear face of the supporting body; and a hydraulic cylinder device 532 having a cylinder supported by the slide body 31 and a plunger 531 extended toward the supporting body 51 with its head engaging with the groove 530. The fixing portion 53 retracts the plunger 531 by hydraulic actuation, to engage with the wall of the groove 530 under a high pressure so that the supporting body 51 is fixed not to be rotated.

The operating portion 60 comprises: a frame 61 supported by the joint portion 50 to be movable in the axial direction of the finishing wheel as hereinafter described; a finishing wheel support gear 62 for rotation of the finishing wheel which gear is supported by the frame 61 and holds the finishing wheel inside; a shifter 63 for moving the frame 61; and a fixing portion 66 for fixing the frame 61 at predetermined positions within the extent of its movement.

Figure 7:
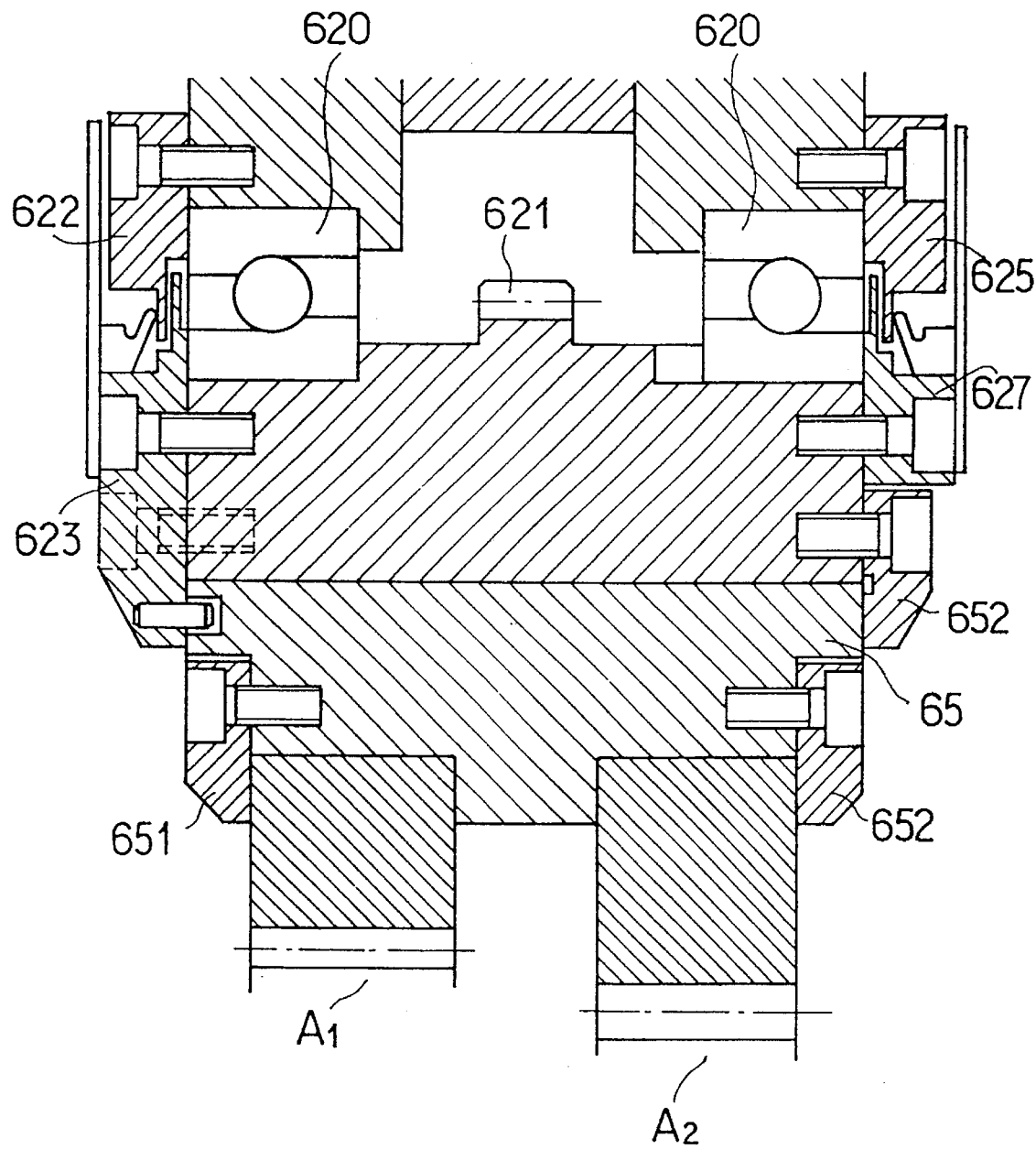
FIG. 7 is a cross section showing in detail a finishing wheel support gear of the gear finishing apparatus shown in FIG. 1 and the surroundings thereof.

The frame 61 is provided with catches 600 which vertically engage with the upper and lower edges of the supporting body 51 in such a manner that the frame moves along the upper and lower edges of the supporting body 51. The frame 61 extends forward from the portion connected with the supporting body 51 to such a large extent as to surround a gear piece W. At the front portion of the frame 61 is provided an opening portion 610 of a large diameter to which the finishing wheel support gear 62 is attached. As shown in FIGS. 5 and 7, the support gear 62 is attached so as to be rotatable via a bearing 620 relative to the frame 61. The support gear 62 has teeth 621 at its outer periphery. On the upper portion of the frame 61 is mounted a driving portion 64 having a motor. A sprocket wheel 640 is attached to the output shaft of the motor. From the sprocket wheel, a chain 641 extends and meshes with the teeth 621 of the support gear 62.

A hoop ring 65 for holding the finishing wheel is fitted into the inside of the support gear 62. As shown in FIG. 5, the frame 61, the support gear 62 and the hoop ring 65 are fixedly connected in such a manner that fixing rings 622 and 623 are screwed to the one side thereof, and fixing ring 624, 625 and 626 are screwed to the other side. The hoop ring 65 is coaxially provided with an engaging projection 650 at the center of the inner surface, and the diameters of the portion adjacent to both sides of the projection correspond to the outer diameters of finishing wheels to be held. Around finishing wheels $A_1$ and $A_2$ fitted into both sides of the engaging projection 650 are attached fixing rings 651 and 652 which are then screwed to the hoop ring 65 for fixing the finishing wheels $A_1$ and $A_2$.

A piston 630 of the sliding section 63 is mounted at the rear of the frame 61 as shown in FIGS. 4 and 5. The piston is secured to the frame 61 at its one end 631, and the other end fits movably into a cylinder bore 510 formed in the supporting body 51 of the joint portion 50 to form a piston head 632. Into the cylinder bore 510 extends oil passages 511 and 512 in communication with a hydraulic apparatus not shown in the drawing. Therefore, hydraulic oil is compressedly sent through the oil passages 511 and 512 so that the piston 630 can be moved to shift the frame 61 relative to the joint portion 50. It is also possible to arrange the sliding section 63 in such a converse manner that the piston 630 is connected to the supporting body 51, and the cylinder bore 510 is formed in the frame 61.

A fixing device 66 is provided at the area where the supporting body 53 of the joint portion and the frame 61 face each other. As shown in FIG. 4, the supporting portion 53 is provided with a groove 513 which narrows outward and extends to the direction of the movement of the frame 61. At the rear end of the frame 61 is provided with a plunger 660 the end portion of which engages with the groove and a hydraulic cylinder 661 for advancing and retracting the plunger. By actuating the hydraulic cylinder 661, the plunger 660 is retracted so as to engage with the groove 513 under a high pressure, thereby fixing the frame 61 to the slide body 51. The fixing devices 66 are provided at four locations in the frame 61 as shown in FIG. 6.

The present gear finishing apparatus works as follows. Firstly, two finishing wheels $A_1$ and $A_2$ are attached to the hoop ring 65 before starting a finish processing. During attaching the wheels, an accurate positional adjustment and a dressing treatment for correcting attachment errors are conducted for both of the wheels. An arbor is attached to a gear piece in such a manner that it projects from each side of the gear. The ends of the arbor is pinched between the tail stocks 21 and 22 for fixing the gear piece on the table. At this time, the slide body 31 is in a retracted position as shown in FIG. 2. The slide body 30 is advanced from this position by the driving motor 32 so that the finishing wheels $A_1$ or $A_2$ is brought into mesh with the gear piece. Next, the driving portion 64 is actuated so as to rotate the support gear together with the finishing wheels, and then the slide body 31 is advanced to a predetermined depth of cut. When the finish processing of the gear piece is completed by the rotation of the finishing wheels and the appropriate repetition of the reciprocal motion of the table 12, the driving portion 64 is stopped, then the slide body 31 is retracted, and the clamping of the tail stocks 21 and 22 are released so as to take out the gear piece.

When one of the finishing wheels (for example, $A_1$) is worn off by the repetition of finish processings, the sliding section 63 is actuated to shift the frame 61 so that the other finishing wheel (for example, $A_2$) comes into a processing position. Therefore, it is not necessary to detach the finishing wheel for replacement so that a finish processing can be continued with another new wheel.

Figure 9:
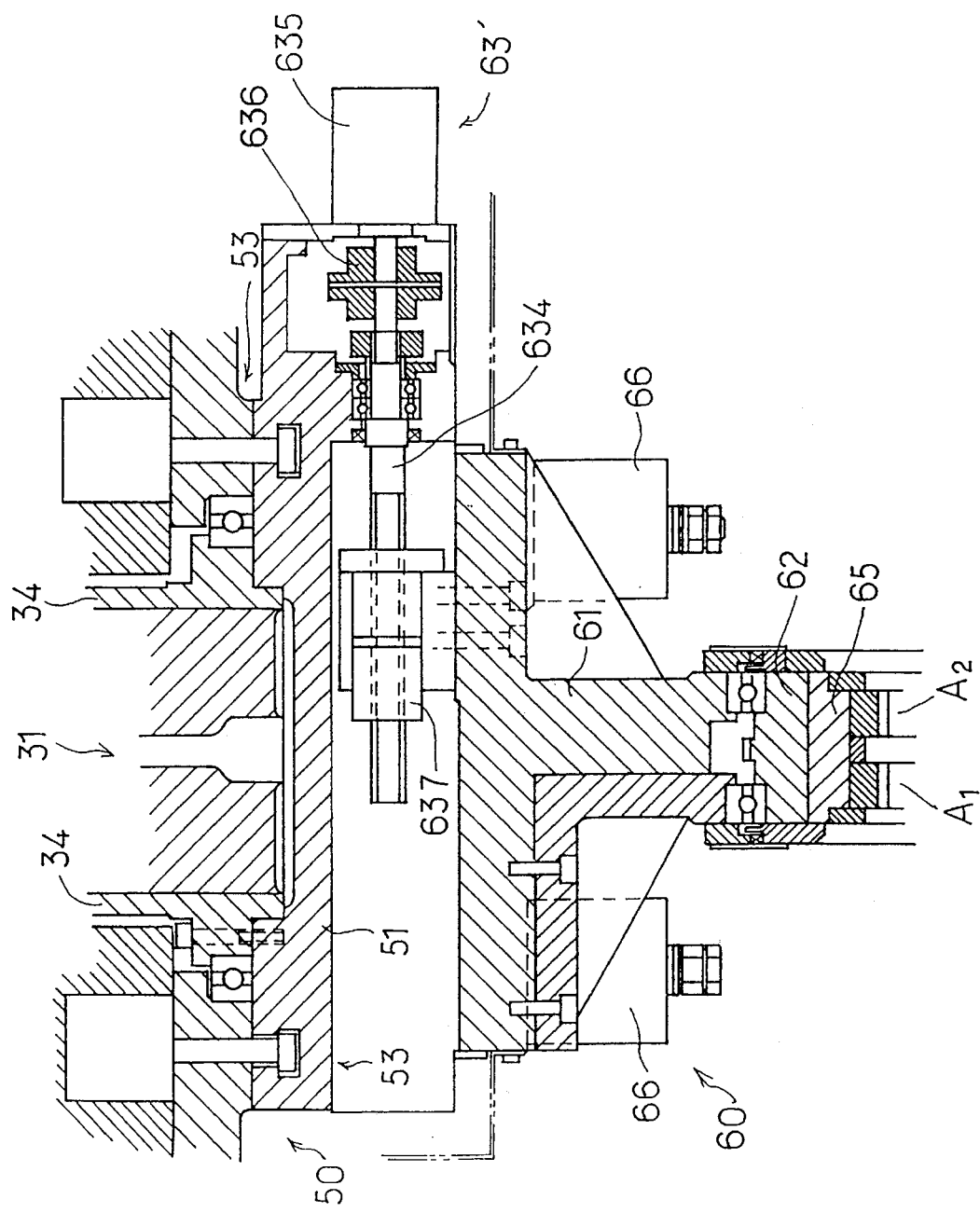
FIG. 9 is a plan view of a finishing wheel holding section provided with another example of a shifter.

Instead of the above-mentioned hydraulic cylinder, a sliding section 63' may be provided with a ball screw 634 (feed screw) in the supporting body 51 of the joint portion 50, a servo motor 635 for driving the ball screw and a coupling 636 between them, wherein a female screw 637 to mesh with the ball screw is fixed to the frame 61 as shown in FIG. 9. Further, these elements may be connected in such a converse manner that the frame 61 is provided with the ball screw (feed screw), the driving motor and the coupling, and that the supporting body 51 is provided with the female screw 637.

Figure 8:
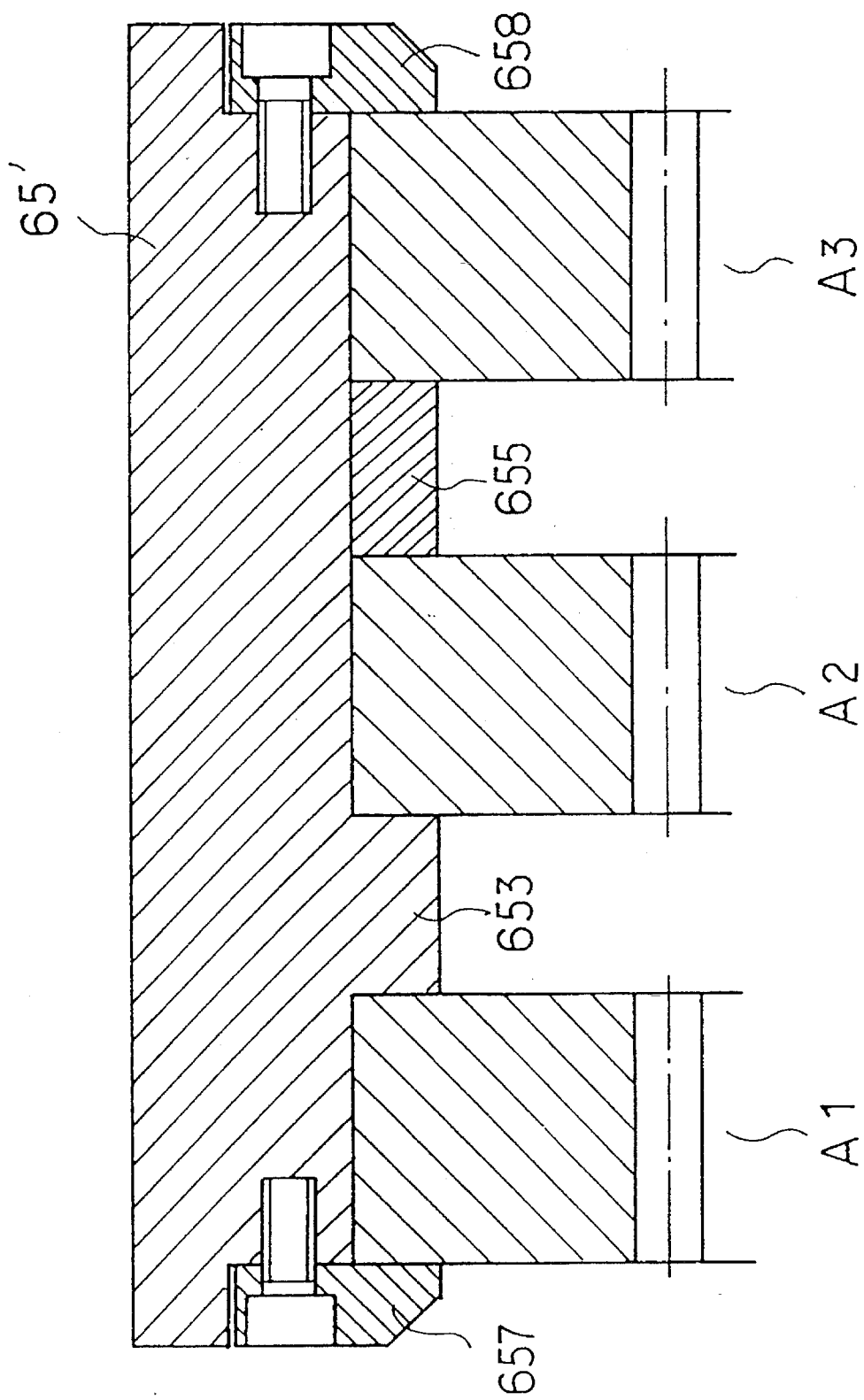
FIG. 8 is a longitudinal section showing another example of a finishing wheel fixing ring attached to the finishing wheel support gear.

With reference to the above embodiments, the apparatus of the type having two finishing wheels have been described. It is also possible to attach three or more finishing wheels by appropriately changing the design of the hoop ring etc. FIG. 8 shows one example of such a hoop ring. This hoop ring 65' comprises an engaging projection 653 located about one third width away from one edge of the hoop ring. An engaging ring 655 is fitted at a distance of about one third width away from the other edge. For attachment of the wheels, the wheels $A_1$ and $A_2$ are fitted in both sides of the engaging projection 653 after detaching the engaging ring 655, and thereafter the engaging ring 655 is fitted thereinto. Furthermore, the wheel $A_3$ is fitted so far as to contact the engaging ring 655. Then, fixing rings 657 and 658 are screwed to stride across the ends of the hoop ring 65' and the peripheries of the wheels $A_1$ and $A_3$ are screwed, whereby three finishing wheels can be fastened. More finishing wheels can be attached when using a wider hoop ring and the required numbers of engaging rings 655 spaced apart from each other by the width of a finishing wheel to be attached.

Further, when attaching a plurality of different kinds of finishing wheels to the present finishing apparatus, it is possible to rapidly conduct necessary processings on different kinds of gears to be processed without detaching the finishing wheels for replacement. In this case, by providing a discriminator for discriminating different kinds of gears to be processed and a controller for controlling the position of the sliding section in accordance with the discrimination result, it is possible to automatically finish different kinds of gears.

While having described the embodiments of the present invention, the present invention is not limited to these embodiments, and various changes may be made without departing from the scope of the present invention.

We claim:

1. A gear finishing apparatus in which a finishing wheel with internal teeth is rotated so as to finish a gear piece in mesh with the finishing wheel, the apparatus comprising:

a base portion;

a work holder supported by a machine table and for holding the gear piece;

a sliding section supported on the base portion and movable close to and away from the gear piece on the work holder in a direction substantially perpendicular to the axis of the gear; and a finishing wheel holding section supported by the sliding section and for holding the finishing wheel, the sliding section having a supporting shaft extending from the sliding section toward the gear piece along the sliding direction of the sliding section.

the finishing wheel holding section comprising:

a joint portion supported by the supporting shaft and holding the finishing wheel at a selected crossed axes angle relative to the gear piece during processing;

an operating portion movable relative to the joint portion in a direction parallel to the axis of the finishing wheel while holding the finishing wheel at the crossed axes angle;

a fixing portion for fixing the operation portion to the joint portion at predetermined positions within the extent of the movement;

a circular support ring rotating with the finishing wheel and holding the finishing wheel therein, said circular support ring being supported rotatably about a central axis thereof by the operating portion; and a drive portion attached to the operating portion and for driving the support ring to rotate, wherein the support ring has a sufficient width and an engaging portion so that a plurality of individual finishing wheels can be arranged and fixed therein adjacent to each other in a direction parallel to the axis of the finishing wheel.

2. A gear finishing apparatus according to claim 1, wherein the work holder comprises a tail stock movable on the machine table, and wherein the sliding section is movable perpendicularly to the movement of the tail stock.

3. A gear finishing apparatus according to claim 1, wherein the operating portion comprises a frame for receiving the support ring inside of an opening and for holding the support ring rotatably about its axis and fixedly in a direction along its axis.

4. A gear finishing apparatus according to claim 3, wherein the operating portion comprises a shifter consisting of a hydraulic cylinder and a piston connected to the one and the other of the joint portion and the frame in order to move the finishing wheel in parallel to its axis relative to the joint portion.

5. A gear finishing apparatus according to claim 3, wherein the operating portion comprises a feed screw and a driving device thereof connected to the one and the other of the joint portion and the frame; and a female screw portion in mesh with the feed screw in order to move the finishing wheel in parallel to its axis relative to the joint portion.

6. A gear finishing apparatus according to claim 1, wherein the support ring comprises a gear having external teeth, and wherein the rotational drive portion meshes with the external teeth of the support ring so as to drive it.

7. A gear finishing apparatus according to claim 1, wherein the engaging portion of the support ring comprises a convex portion extending concentrically along the center of the inner surface of the wheel, and wherein the finishing wheels accommodated in both sides of the convex portion are fixed by fixing rings attached to both sides of the support ring.

8. A gear finishing apparatus according to claim 1, wherein the engaging portion of the support ring comprises at least one engaging ring having such an outer diameter as to be closely fitted into the support ring, and wherein the plurality of finishing wheels are accommodated in the support ring with the engaging rings interposed therebetween and are fixed by the fixing rings attached to both sides of the support ring.

9. A gear finishing apparatus according to, claim 1, wherein the engaging portion of the support ring comprises a convex portion extending concentrically along the inner surface and at least one engaging ring having such an outer diameter as to be closely fitted into the support ring, and wherein the plurality of finishing wheels are accommodated in the support ring with the engaging rings interposed therebetween and are fixed by the fixing rings attached to both sides of the support ring.

* * * * *